(12) United States Patent
Albert et al.

(10) Patent No.: US 7,427,442 B2
(45) Date of Patent: Sep. 23, 2008

(54) CORROSION PROTECTION ON METALS

(75) Inventors: Philipp Albert, Loerrach (DE); Ekkehard Mueh, Rheinfelden (DE); Eckhard Just, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 214 days.

(21) Appl. No.: 10/552,918

(22) PCT Filed: Sep. 23, 2003

(86) PCT No.: PCT/EP03/10560
§ 371 (c)(1), (2), (4) Date: Oct. 11, 2005

(87) PCT Pub. No.: WO2004/098795
PCT Pub. Date: Nov. 18, 2004

(65) Prior Publication Data
US 2006/0204767 A1 Sep. 14, 2006

(30) Foreign Application Priority Data
May 9, 2003 (DE) .............................. 103 20 779

(51) Int. Cl.
B32B 9/04 (2006.01)
B32B 15/04 (2006.01)
B32B 19/00 (2006.01)

(52) U.S. Cl. ...................... 428/447; 428/457; 428/450; 428/702

(58) Field of Classification Search ................. 428/447
See application file for complete search history.

(56) References Cited

U.S. PATENT DOCUMENTS

| 5,139,601 | A | * | 8/1992 | Holmes-Farley et al. ..... 156/329 |
| 5,182,143 | A | * | 1/1993 | Holmes-Farley et al. ..... 427/409 |
| 5,200,275 | A | | 4/1993 | Van Ooij et al. |
| 5,759,629 | A | | 6/1998 | Van Ooij et al. |
| 5,902,645 | A | * | 5/1999 | Vorse et al. ................. 427/387 |
| 6,177,582 | B1 | | 1/2001 | Jenkner et al. |
| 6,251,989 | B1 | | 6/2001 | Edelmann et al. |
| 6,261,638 | B1 | * | 7/2001 | van Ooij et al. ............. 427/379 |
| 6,361,871 | B1 | | 3/2002 | Jenkner et al. |
| 6,403,164 | B1 | | 6/2002 | Jonschker et al. |
| 6,426,150 | B1 | | 7/2002 | Jenkner et al. |
| 6,432,191 | B2 | * | 8/2002 | Schutt ................... 106/287.13 |
| 6,713,186 | B1 | | 3/2004 | Jenkner et al. |
| 6,858,746 | B2 | | 2/2005 | Giessler et al. |
| 2002/0192385 | A1 | | 12/2002 | Jenkner et al. |

FOREIGN PATENT DOCUMENTS

| DE | 198 13 709 | 9/1999 |
| DE | 199 38 551 | 2/2001 |
| EP | 0 492 306 | 7/1992 |
| EP | 0 866 037 | 9/1998 |
| EP | 1 130 066 | 9/2001 |
| WO | 98/19798 | 5/1998 |
| WO | 98/30735 | 7/1998 |
| WO | 00/46310 | 8/2000 |
| WO | 01/30922 | 5/2001 |

OTHER PUBLICATIONS

English translation of DE-19938551, cited on the international search report as an "X" reference.*
Von K.H. Adams: "Die chemische Oberflaechenvorbehandlung von Aluminium", Metalloberflaeche, vol. 29, Booklet 10, pp. 517-520, 1975.
Von Thomas Schmidt-Hansberg: "Verfahrensentwicklung auf dem Gebiet der Silane und Sam", Galvanotechnik, vol. 92, Booklet No. 12, pp. 3243-3249, 2001.
Richtlinie 2000/53/EG des Europaeischen Parlaments und des Rates vom Sep. 18, 2000 ueber Altfahrzeuge, Vom Oct. 21, 2000 (Amtsblatt EU Nr. 269 S. 34), pp. 1-8, AbfR 2.1.3.
U.S. Appl. No. 10/552,918, filed Oct. 11, 2005, Albert et al.
U.S. Appl. No. 10/556,040, filed Nov. 8, 2005, Albert et al.

* cited by examiner

*Primary Examiner*—Randy Gulakowski
*Assistant Examiner*—Robert Loewe
(74) *Attorney, Agent, or Firm*—Oblon, Spivak, McClelland, Maier & Neustadt, P.C.

(57) ABSTRACT

Corrosion protection on metals The present invention relates to a coating on a metal to protect against corrosion, comprising the following layer sequence: (i) metal surface, (ii) layer based on a sol containing silicon compounds, (iii) layer based on at least one organosilane, (iv) if desired, one or more coating films. The present invention further relates to a process for producing such a coating and to the use thereof.

18 Claims, No Drawings

CORROSION PROTECTION ON METALS

The present invention relates to a special coating on a metal to protect against corrosion, to a process for producing such a coating, and to the use thereof.

Anti-corrosion compositions for metals and also adhesion promoters (referred to hereinbelow as primers) based on organosilanes or $SiO_2$ sol have been known for a long time and have been described in diverse form. Unfortunately the known systems still leave something to be desired.

Common methods of producing anti-corrosion layers on metallic surfaces include chromating, phosphating, coating, and anodizing.

The industrial significance of chromating is at the present time continuing to decline owing to toxicological problems and corresponding reclassification of the chromates (EU Directive 2000/53/EG). Despite the good corrosion protection properties of chromating, therefore, the development of new, chromium-free systems is of generally high interest.

Methods of phosphating iron, steel, zinc; and aluminum have long been state of the art. Phosphating in combination with a coating is enough to afford an entirely acceptable corrosion control, whereas the two systems alone do not lead to the desired results.

Electrolytically produced protective oxide films on metals, such as aluminum or titanium, despite affording adequate protection against corrosion, exhibit brittleness as the thickness of the oxide films increases, and require a large amount of energy for their production.

Present developments are attempting to deposit perfect monolayer films on the metal surfaces, or are working with conversion coats of cerium [Galvanotechnik 92 (12), 2001, 3243].

Further approaches to avoiding chromates(VI) are formulations which contain chromium(III) and which therefore cannot be considered to be free of heavy metals.

Eco-friendly anti-corrosion layers can be obtained with silanes and also hydrolyzed silanes (WO 98/19798, WO 00/46310) or with silane-based sol-gel condensates (U.S. Pat. No. 5,200,275).

For the coating of the surfaces the metal substrates are generally first degreased and cleaned. The cleaning steps may include treatment with organic solvents and also alkaline and acidic pickling operations [Metalloberfläche, 29 (10), 1975, 517]. The silanes are hydrolyzed in aqueous or at least water-containing solutions and then contacted with the metal surface by immersion, spraying and/or spin coating applications. Curing or condensation takes place in air at room temperature or elevated temperature.

WO 98/30735 discloses the twofold coating of the metal with organosilane solutions. The film thicknesses achieved in that case are normally between 10 and 100 nm.

Sol-gel systems (also referred to hereinbelow as sol) are prepared by means of an acidic or basic catalyst from hydrolyzable silicon compounds, often in combination with corresponding Al, Ti and/or Zr precursors. For this purpose the components are hydrolyzed together and converted into a sol or a gel. The solvent/diluent used can be an alcohol which is also formed during the hydrolysis of the compounds. The coating composition can be applied to the metallic substrates in turn by means of a coating method already mentioned above. The coating composition is applied preferably in dry film thicknesses of from 1 to 50 μm without any final coating with a topcoat material being envisaged (DE-A 198 13 709).

EP 1 130 066 A1 discloses corrosion-protected metal surfaces which have been pretreated with a silane composition and subsequently extrusion coated with a polyamide compound. The water- and alcohol-containing silane composition employed is based, inter alia, on hydrolyzates, condensates and/or cocondensates, starting from alkoxysilanes Q which carry functional groups, such as aminoalkylalkoxysilanes, and alkoxysilanes M, such as alkyalkoxysilanes, alkenylalkoxysilanes and tetraalkoxysilanes, the sum of components M and Q being present in a molar ratio of $0 \leq M/Q < 20$.

It is an object of the present invention to provide a further means of protecting a metal against corrosion. A particular concern was to protect specifically the surface of copper, aluminum and aluminum alloys against corrosion by means of a coating. A further concern was to find a highly effective and nevertheless eco-friendly solution.

This object is achieved in accordance with the invention as per the details in the patent claims.

Surprisingly it has been found that a particularly effective anti-corrosion coating is obtainable on a metal surface in a comparatively simple, economical, and eco-friendly way by
 optionally pretreating the metal surface,
 applying a sol containing silicon compounds to the metal surface,
 if desired, partly or fully drying the applied sol film,
 coating the sol film with an in particular monomeric or else a partly hydrolyzed or oligomeric organosilane,
 drying and also curing the sol and organosilane films, and
 if desired, applying one or more coating films to the layer system thus obtained, i.e., coating it, drying the coats, and also curing them.

The present invention accordingly provides a coating on a metal to protect against corrosion, comprising the following layer sequence:
 (i) metal surface,
 (ii) layer based on a sol containing silicon compounds,
 (iii) layer based on at least one monomeric organosilane,
 (iv) if desired, one or more coating films.

A coating of this kind, obtainable by applying the teaching of the invention, to protect metals against corrosion generally constitutes a very thin, hydrophobic, transparent coating with barrier effect. It is in particular an especially effective barrier film for electrolyte solutions and so advantageously brings about passive protection against corrosion for metals, particularly for copper, aluminum and aluminum alloys.

The present coating can be employed effectively either with or without coating film sequence (iv).

Accordingly the sol-organosilane coating (ii)/(iii) of the invention can be employed additionally as an oil- and dirt-repellent coating system, in which case the layer (iii) is based preferably on the use of fluoralkylalkoxysilanes of the general formula $R^1-Y_u-(CH_2)_2Si(R^2)_y(OR)_{3-y}$. In this formula $R^1$ is preferably a mono-, oligo- or perfluorinated alkyl group having from 1 to 13 carbon atoms, i.e. a linear, branched or cylic alkyl group, or a mono-, oligo- or perfluorinated aryl group, Y is a $CH_2-$, $O-$ or S group with u being 0 or 1, $R^2$ is a linear, branched or cyclic alkyl group having 1 to 8 carbon atoms or is an aryl group, and y is 0 or 1. In this case it is possible, for example, to use tridecafluoro-1,1,2,2-tetrahydrooctyltrimethoxysilane or tridecafluoro-1,1,2,2-tetrahydrooctyltriethoxysilane, to name but a few examples.

For a layer (iii) it is also to possible to choose at least one functional group of the organosilane so that it attaches chemically to a coating material applied to it. Thus preference is given to aminosilanes or expoxy-functional silanes, such as 3-aminopropyltrialkoxysilane or 3-glycidyloxypropyltrialkoxysilane, for acrylic, urethane or epoxy coating materials, and organosilanes containing double bonds, such as 3-methacryloxyoxlpropyltrialkoxysilane or vinyltrialkoxysilanes, for free-radically curing coating systems, alkoxy here and below preferably being methoxy, ethoxy, propoxy, butoxy or 2-methoxyethoxy.

With coatings according to the invention, it is observed in a corrosion test, particularly in the case of aluminum, that there is virtually no "scribe creep" or corrosive migration beneath the coating material starting from the scribe mark. Accordingly, through the formation of very thin barrier films, the coatings of the invention afford good passive protection against corrosion. This inventively thin anti-corrosion coating also effects astonishingly good coverage of rough surfaces, such as mechanically abraded aluminum sheets, for example. Consequently coatings of this kind may replace not only chromating but also the cathodic electrocoating which normally follows.

The advantages of the present coatings are as follows:
outstanding protection against corrosion on metal surfaces even at film thicknesses below 1 μm and even without a further coating system;
extremely high electrical volume resistances:
comparatively eco-friendly composition;
the possibility of avoiding chromating;
simple and economic application of the composition;
effective coating, both mechanically and chemically, and also, in particular under the influence of humidity in conjunction with salt;
particularly good adhesion to the metal to be protected and to any subsequent coatings, such as paint or polymer coatings.

The present invention also provides the process for producing a coating of the invention, which comprises
if desired, pretreating the metal surface,
applying a sol containing silicon compounds to the metal surface,
if desired, drying the applied sol film,
coating the sol film with an organosilane,
drying and also curing the sol and organosilane films, and
if desired, applying one or more coating films to the layer system thus obtained.

The process of the invention is preferably employed on the surface of a metal (i) from the group consisting of aluminum, aluminum alloy, magnesium, magnesium alloy, zinc, zinc alloy, titanium, titanium alloy, iron, iron alloy, galvanized iron sheet, galvanized iron alloy, tin, tin alloy, copper, copper alloy, and silver and silver alloy.

When employing the process of the invention it is generally not absolutely necessary to treat the metal surface. However, it is advisable to clean the metal surface to be coated beforehand. For example, the metal surface to be coated can be degreased using an appropriate solvent. Alternatively, the metal surface may be pretreated mechanically by abrading, thermally by heating, or chemically by etching. The metal surface to be treated should at least, however, be dry.

In the process of the invention a sol containing silicon compounds can be applied to the optionally pretreated metal surface by means, for example, of dipping, brushing, spraying, knife coating or spin coating.

A sol of this kind containing silicon compounds can be prepared in a conventional manner. In the process of the invention it is preferred to employ at least one alkoxysilane from the group consisting of tetramethoxysilane, methyltrimethoxysilane, propyltrimethoxysilane, isopropyltrimethoxysilane, octyltrimethoxysilane, hexadecyltrimethoxysilane, octadecyltrimethoxysilane, tetraethoxysilane, methyltriethoxysilane, propyltriethoxysilane, isopropyltriethoxysilane, octyltriethoxysilane, hexadecyltriethoxysilane and octadecyltriethoxysilane or a mixture of at least two of the aforementioned alkoxysilanes. Generally for this purpose an alkoxysilane is subjected to controlled hydrolysis and the hydrolysate is reacted to the sol with heating and thorough mixing where appropriate. To this end, the ripening sol is appropriately reacted at a temperature in the range from 10 to 80° C., preferably from 10 to 60° C., more preferably from 20 to 30° C., for from 1 minute to 24 hours, in particular for from 10 to 60 minutes. Said reaction may where appropriate be conducted in the presence of a hydrolysis catalyst, such as an organic or a mineral acid, for example, such as acetic acid, citric acid or phosphoric acid, sulphuric acid or nitric acid or a base, such as sodium methoxide, sodium ethoxide, sodium hydroxide, potassium hydroxide, ammonia or organic amines, such as alkylamines, for example. The hydrolysis catalyst can be introduced in a mixture with the water, which here is used for hydrolysis. Furthermore, a diluent/solvent can be added to the actual hydrolysate or to the sol obtained, an example of such a diluent/solvent being the alcohol corresponding to the alkoxy group of the alkoxysilane employed. The sol used in accordance with the invention preferably includes water, methanol, ethanol, isopropanol, butanol, methoxypropanol, butyl glycol or a mixture of at least two of the aforementioned solvents/diluents. Thus the sol may contain from 1 to 99% by weight, preferably from 15 to 80% by weight, more preferably from 30 to 50% by weight, of solvent/diluent, the amount being based on the overall makeup of the present sol. The sol can also be adjusted to a pH of from 1 to 6 by addition of one of the abovementioned acids.

By way of example a sol may be obtained from 50 to 100 parts by weight of at least one alkoxysilane, methyltrialkoxysilane and/or tetraalkoxysilane, for example, 0.01 to 5 parts by weight of acid, phosphoric acid for example, 5 to 150 parts by weight of water, and optionally 10 to 200 parts by weight of alcohol, ethanol for example, hydrolysis and subsequent reaction being carried out suitably with stirring at a temperature of from 10 to 80° C. for a time of from 10 minutes to 5 days. A formulation obtained in this way, which is generally clear, or opalescent to milky, can then be used as it is or in diluted form in the process of the invention. In the process of the invention, after the sol has been applied to the metal surface, the sol film applied to the metal surface can be subjected to partial thermal drying or to drying or curing in an intermediate step. Drying takes place preferably at a temperature of up to 220° C., in particular from 10 to 200° C., generally producing a sol layer (ii) which is dry to hard on the surface, is predominantly clear, and adheres well to the metal.

The dry film thickness of the layer (ii) is suitably from 0.1 μm to 10 μm, preferably from 0.3 μm to 5 μm and very preferably from 0.5 μm to 2 μm.

Thereafter, in the process of the invention, the organosilane can be applied by dipping, spraying or brushing to the sol layer produced beforehand and can be subjected to partial thermal drying, drying and/or curing to give the layer (iii).

For producing the layer (iii) preference is given to aqueous or aqeuous-alcoholic solutions of said organosilanes. The organosilanes may be in monomeric form, partially hydrolyzed form, or else, possibly, partly oligomerized form.

The layer (iii) preferably has a dry film thickness of from 5 to 500 nm, in particular from 10 to 100 nm.

An alternative possibility in accordance with the invention is to apply a sol to an optionally pretreated metal surface and to cover this sol film with the organosilane, subsequently subjecting the sol and organosilane films thus produced to joint full or partial drying or curing. A procedure of this kind allows a saving to be made of one drying or curing step.

In the process of the invention for producing the layer (iii) it is therefore preferred to use the following organosilanes:

aminoalkyl-functional alkoxysilanes from the group consisting of 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, N-(2-aminoethyl)-3-aminopropyl-methyldimethoxysilane, N-(2-aminoethyl)-3-aminopropyl-methyldiethoxysilane, N,N-di(2-aminoethyl)-3-aminopropyltrimethoxysilane, N,N-di(2-aminoethyl)-3-aminopropyltriethoxysilane, N-[N'-(2-aminoethyl)]-3-aminopropyltrimethoxysilane, N-[N'-(2-aminoethyl)-2-aminoethyl)]-3-aminopropyltriethoxysilane, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-cyclohexyl-3-aminopropyltrimethoxysilane, N-cyclohexyl-3-aminopropyltriethoxysilane, N-phenyl-3-aminopropyltrimethoxysilane, 3-aminopropyl-methyldimethoxysilane, 3-aminopropylmethyldiethoxysilane, bis(3-trimethoxysilylpropyl)amine, and bis(3-triethoxysilylpropyl)amine or epoxy-functional alkoxysilanes from the group consisting of 3-glycidyloxypropyltrimethoxysilanes, 3-glycidyloxypropyltriethoxysilanes, β-(3,4-epoxycyclohexyl)ethyltrimethoxysilane or organosilanes containing double bonds, from the group consisting of vinyltrimethoxysilane, vinyltriethoxysilane, vinyltris(2-methoxyethoxy)silane, 3-methacryloyloxypropyltrimethoxysilane or fluoro-functional organosilanes of the general formula $R^1-Y_u-(CH_2)_2Si(R^2)_y(OR)_{3-y}$, where $R^1$ is a mono-, oligo- or perfluorinated alkyl group having from 1 to 13 carbon atoms or a mono-, oligo- or perfluorinated aryl group, Y is a $-CH_2-$, $-O-$ or $-S-$ group with u being 0 or 1, $R^2$ is a linear, branched or cyclic alkyl group having 1 to 8 carbon atoms or is an aryl group, and y is 0 or 1, or a mixture of at least two of the aforementioned organosilanes or a partial hydrolysate of the aforementioned organosilanes or an aqueous-alcoholic solution of the aforementioned organosilanes, i.e., a partial or complete hydrolysate of the aforementioned organosilanes, or condensation products of the aforementioned organosilanes and hydrolysates, or an aqueous-alcoholic solution of the aforementioned organosilanes, hydrolysates or condensation products. Such a solution contains preferably from 0.01 to 99.99% of the aforementioned organosilanes, hydrolysates or condensation products and from 0.01 to 99.99% by weight of water or alcohol, or any desired mixture of water and alcohol, based in each case on 100% by weight of solution.

To a generally already cured layer sequence (ii)/(iii) of this kind it is additionally possible to apply one or more coating films in a conventional manner, preference being given to coating films having a thickness of from 1 to 500 μm, in particular from 5 to 100 μm, very preferably from 10 to 50 μm.

Such coating materials may, for example, be matt or high-gloss clearcoats, decorative coats, color coats, and pigmented coating materials, and also scratch-resistant or abrasion-resistant topcoats.

In the process of the invention it is preferred to produce at least one coating layer (iv) from the group consisting of acrylic, epoxy, urethane, polyester, and synthetic resin coating materials.

The present invention likewise provides for the use of a coating of the invention to protect against corrosion for a metal from the group consisting of aluminum, aluminum alloys, magnesium, magnesium alloys, zinc, zinc alloys, titanium, titanium alloys, iron, iron alloys, galvanized iron sheet, galvanized iron ally, tin, tin alloys, copper, copper alloys, and silver and silver alloys.

The coating of the invention can be used to particular advantage in automobile construction, in mechanical engineering, in shipbuilding, in aircraft construction, or for house construction components.

The invention accordingly provides a process which allows a new coating to be produced on metal surfaces for the purpose of protecting the metals against corrosion, in a way which is advantageous in that it is comparatively simple and economical. Through the coating of the invention, in particular, a distinct improvement is achieved in the protection of copper, aluminum and aluminum alloys against corrosion, the anti-corrosion coating produced in accordance with the invention further possessing excellent adhesion directly on the metallic substrate and also being obtainable in an advantageous way.

The present invention is illustrated by the following examples, without restriction of its subject matter.

EXAMPLES

Example 1

1.1 Preparation of the Sol:

120 g of tetraethoxysilane (DYNASIL® A) und 300 g of methyltriethoxysilane (DYNASYLAN® MTAS) were charged to a 4-necked flask with mechanical stirrer, reflux condenser, dropping funnel, and thermometer. With intensive stirring 42 g of deionized water were added dropwise over the course of 5 minutes and the mixture was diluted with 138 g of isopropanol. The pH was adjusted to 3.5 using phosphoric acid. The mixture, which was cloudy to start with, was stirred for a further 5 hours. This gave a clear sol.

For application, 100 parts by weight of sol were diluted with 95 parts by weight of isopropanol and the diluted sol was activated by adding 5 parts by weight of water and then stirring it for 30 minutes.

1.2 Cleaning of the Metals:

All the metal sheets were degreased with organic solvents, pickled in dilute (10%) alkaline cleaning solution (CARELA® SP, R. Späne GmbH) at 70° C. for 10 to 20 seconds, and then rinsed off with deionized water. The sheets were further pickled in dilute (0.0016 mol/l) nitric acid for 5 minutes, rinsed with deionized water, and dried.

1.3 Application of the Coatings:

Untreated test sheets (of Al Alloy 6016:$AlMg_{0.4}Si_{1.2}$) were cleaned in accordance with 1.2 and immersed for 5 minutes in the activated coating sol A described under 1.1. The sheets were stood up vertically in order to allow excess sol to drip off. After a drying time of 2 h at room temperature the sheets were coated a second time with a 1% strength alcoholic-aqueous solution of triethoxy(3,3,4,4,5,5,6,6,7,7,8,9-tridecafluorooctyl)silane. The sheets were then dried at 200° C. for 10 minutes.

1.3 Testing of the Sheets:

The sheets exhibited a high static contact angle with respect to water, of 103°. The sheets were subsequently stored for 10 days in the acidic corrosion solution (solution as per CASS-Test, DIN 50021) in closed corrosion chambers at 50° C. The corrosion solution was replaced daily. There was only a slight attack on the surface of the coated sheets.

Example 2

2.1 Application of the Coating:

Bright copper sheets and copper sheets with oxide surfaces were cleaned in accordance with 1.2, but without the $HNO_3$ pickling, or were only degreased with organic solvents. The copper sheets were immersed in the activated coating sol described under 1.1 for 5 minutes. The sheets were then stood up vertically in order to allow excess sol to drip off. Following initial drying at room temperature the sheets were coated a second time for 5 minutes with a 1% strength alcoholic-aqueous solution of N-(n-butyl)-3-aminopropyltrimethoxysilane, which contained acetic acid. After brief initial drying at room temperature, curing was carried out for 10 minutes at 150° C. (bright copper) or for 10 minutes at from 100 to 190° C. (oxide surfaces). The silane-coated metal sheets were coated with a 2-component polyurethane varnish (Standox GmbH) and dried at 60° C. for 600 minutes. The thickness of the varnish layer is approximately 25 μm.

2.2 Testing of the Sheets:

The coated copper sheets were stored in deionized water, after which the copper ion content of the aqueous phase was determined. For comparison, uncoated sheets were also subjected to this elution test. After 48 hours the solutions with the uncoated sheets were found by means of ICP (inductively coupled plasma) mass spectrometry to have an increased copper concentration, while in the case of the sheets with an applied barrier layer it was not possible to detect any copper ions dissolved out of the metal.

Example 3

3.1 Application of the Coatings:

Test sheets (of Al Alloy 6016) were cleaned in accordance with 1.2 and immersed for 5 minutes in the activated coating sol described under 1.1. The sheets were stood up vertically in order to allow excess sol to drip off. After initial drying at room temperature the sheets were coated a second time for 5 minutes with a 1% strength alcoholic-aqueous solution of N-(n-butyl)-3-aminopropyltrimethoxysilane, which contained acidic acid. After brief initial drying at room temperature, curing was carried out at 200° C. for 10 minutes. The silane-coated aluminum sheets were coated with a 2-component polyurethane varnish (Standox GmbH) and dried at 60° C. for 60 minutes. The thickness of the varnish film is approximately 25 μm.

3.2 Testing of the Sheets:

In the case of the test sheets coated in 3.1 there was no scribe creep even after 1000 h in the salt spray mist test (DIN 50021). The abrasion resistance (to DIN EN 24624) of the coating was very high, at levels of >27 MPa.

What is claimed is:

1. A coating on a metal to protect against corrosion, comprising the following layer sequence:
    (i) metal surface,
    (ii) cured layer based on a sol containing silicon compounds and having a pH of from 1 to 6, wherein the sol used to produce the sol layer (ii) is based on at least one tetraalkoxysilane and/or at least one alkylalkoxysilane,
    wherein the sol used to produce the sol layer (ii) is based on at least one alkoxysilane selected from the group consisting of tetramethoxysilane, methyltrimethoxysilane, propyltrimethoxysilane, isopropyltrimethoxysilane, octyltrimethoxysilane, hexadecyltrimethoxysilane, octadecyltrimethoxysilane, tetraethoxysilane, methyltriethoxysilane, propyltriethoxysilane, isopropyltriethoxysilane, octyltriethoxysilane, hexadecyltriethoxysilane, and octadecyltriethoxysilane or a mixture of at least two of the aforementioned alkoxysilanes,
    (iii) cured layer based on at least one organosilane selected from the group consisting of 3-aminopropyltrimethoxysilane, 3-aminopropyl-triethoxysilane, N-(2-aminoethyl)-3-aminopropyltrimethoxysilane, N-(2-aminoethyl)-3-aminopropyltriethoxysilane, N-(2-aminoethyl)-3-aminopropyl-methyldimethoxysilane, N-(2-aminoethyl)-3-aminopropyl-methyldiethoxysilane, N,N-di(2-aminoethyl)-3-aminopropyltrimethoxysilane, N,N-di(2-aminoethyl)-3-aminopropyltriethoxysilane, N-[N'-(2-aminoethyl)-2-aminoethyl)]-3-aminopropyltrimethoxysilane, N-[N'-(2-aminoethyl)-2-aminoethyl)]-3-aminopropyltriethoxysilane, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-cyclohexyl-3-aminopropyltrimethoxysilane, N-cyclohexyl-3-aminopropyltriethoxysilane, N-phenyl-3-aminopropyltrimethoxysilane, 3-aminopropylmethyldimethoxy-silane, 3-aminopropylmethyldiethoxysilane, bis(3-trimethoxysilylpropyl)amine, and bis(3-triethoxysilylpropyl)amine or at least one fluoro-functional organosilane of the general formula $R^1$—$Y_u$—$(CH_2)_2Si(R^2)_y(OR)_{3-y}$, where $R^1$ is a mono-, oligo- or perfluorinated alkyl group having from 1 to 13 carbon atoms or a mono-, oligo- or perfluorinated aryl group, Y is a —$CH_2$—, —O— or —S— group with u being 0 or 1, $R^2$ is a linear, branched or cyclic alkyl group having 1 to 8 carbon atoms or is an aryl group, and y is 0 or 1, or
    a mixture of at least two of the aforementioned organoalkoxysilanes or a partial hydrolysate of the aforementioned organosilanes or an aqueous-alcoholic solution of at least one organosilane, and
    (iv) optionally, one or more coating films.

2. The coating as claimed in claim 1, comprising a metal (i) selected from the group consisting of aluminum, aluminum alloy, magnesium, magnesium alloy, zinc, zinc alloy, titanium, titanium alloy, iron, iron alloy, galvanized iron sheet, galvanized iron alloy, tin, tin alloy, copper, copper alloy, and silver and silver alloy.

3. The coating as claimed in claim 1, comprising at least one coating film (iv) selected from the group consisting of acrylic, epoxy, urethane, polyester, and synthetic resin coating materials.

4. A process for producing a coating on a metal to protect against corrosion as claimed in claim 1, which comprises
    optionally pretreating the metal surface,
    applying a sol containing silicon compounds to the metal surface,
    optionally, drying the applied sol film, coating the sol film with an organosilane,
    drying and also curing the sol and organosilane films, and,
    optionally, applying one or more coating films to the layer system this obtained.

5. The process as claimed in claim 4, wherein the drying and/or curing of the films is conducted at a temperature in the range from 0 to 220° C. and for a period of more than 1 minute to 24 hours.

6. A method of protecting a metal from corrosion comprising applying the coating as claimed in claim 1 to a metal selected from the group consisting of aluminum, aluminum alloys, magnesium, magnesium alloys, zinc, zinc alloys, titanium, titanium alloys, iron, iron alloys, galvanized iron sheet, galvanized iron ally, tin, tin alloys, copper, copper alloys, and silver and silver alloys.

7. The method of protecting a metal from corrosion as claimed in claim 6, wherein the metal is utilized in automobile construction, in mechanical engineering, in shipbuilding, in aircraft construction or for house construction components.

8. The coating as claimed in claim 1, wherein in a corrosion test, there is virtually no scribe creep or corrosive migration beneath the coating starting from a scribe mark.

9. The coating as claimed in claim 1, wherein said sol comprises from 1 to 99% by weight of a solvent/diluent, based on a total amount of said sol.

10. The coating as claimed in claim 9, wherein said sol comprises as diluent/solvent an alcohol corresponding to the alkoxy group of the alkoxysilane employed.

11. The coating as claimed in claim 9, wherein said sol comprises as diluent/solvent water, methanol, ethanol, isopropanol, butanol, methoxypropanol, butyl glycol or mixtures thereof.

12. The coating as claimed in claim 1, wherein said sol comprises from 15 to 80% by weight of a solvent/diluent, based on a total amount of said sol.

13. The coating as claimed in claim 1, wherein said sol comprises from 30 to 50% by weight of a solvent/diluent, based on a total amount of said sol.

14. The coating as claimed in claim 1, wherein a dry film thickness of the layer (ii) is from 0.1 to 10 µm.

15. The coating as claimed in claim 1, wherein a dry film thickness of the layer (ii) is from 0.3 to 5 µm.

16. The coating as claimed in claim 1, wherein a dry film thickness of the layer (ii) is from 0.5 to 2 µm.

17. The coating as claimed in claim 1, wherein a dry film thickness of the layer (iii) is from 5 to 500 nm.

18. The coating as claimed in claim 1, wherein a dry film thickness of the layer (iii) is from 10 to 100 nm.

* * * * *